US012666240B2

(12) United States Patent
Nayak et al.

(10) Patent No.: US 12,666,240 B2
(45) Date of Patent: Jun. 23, 2026

(54) METHODS AND APPARATUS FOR PRIORITIZATION HANDLING FOR EPCS OPERATION

(71) Applicant: Samsung Electronics Co., Ltd., Suwon-si (KR)

(72) Inventors: Peshal Nayak, Plano, TX (US); Vishnu Vardhan Ratnam, Plano, TX (US); Rubayet Shafin, Allen, TX (US); Boon Loong Ng, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 18/356,136

(22) Filed: Jul. 20, 2023

(65) Prior Publication Data

US 2024/0048953 A1     Feb. 8, 2024

Related U.S. Application Data

(60) Provisional application No. 63/395,241, filed on Aug. 4, 2022.

(51) Int. Cl.
H04W 4/90          (2018.01)
(52) U.S. Cl.
CPC .................................... H04W 4/90 (2018.02)
(58) Field of Classification Search
CPC ......... H04W 4/80; H04W 4/90; H04W 76/50;
H04W 67/61; H04W 69/14; H04W 69/24;
H04W 84/16; H04W 72/56; H04W 76/15;
H04W 84/12
USPC ....................................................... 455/404.1
See application file for complete search history.

(56) References Cited

U.S. PATENT DOCUMENTS

| | | | |
|---|---|---|---|
| 11,343,796 B2 * | 5/2022 | Tang ...................... | H04W 72/23 |
| 2021/0144778 A1 | 5/2021 | Cherian et al. | |
| 2022/0182872 A1 * | 6/2022 | John ................... | H04L 47/2408 |

(Continued)

FOREIGN PATENT DOCUMENTS

WO          2017076986 A1      5/2017

OTHER PUBLICATIONS

Extended European Search Report issued Feb. 5, 2025 regarding Application No. 23850329.6, 8 pages.

(Continued)

*Primary Examiner* — Jean A Gelin

(57)          ABSTRACT

Methods and apparatuses for prioritization handling for emergency preparedness communication services (EPCS) operation are disclosed. A method for wireless communication performed by a non-access point (AP) device that comprises a station (STA) includes: forming a link with an AP; receiving information associated with emergency preparedness communication services (EPCS) from the AP; determining whether the STA and the AP support an EPCS operation; based on determining that the STA and the AP support the EPCS operation; determining whether the AP supports prioritization for EPCS devices; when the AP does not support prioritization for EPCS devices, performing the EPCS operation; and when the AP supports prioritization for EPCS devices, performing a prioritized EPCS operation, wherein the prioritized EPCS operation comprises prioritization among EPCS devices.

20 Claims, 12 Drawing Sheets

(56) References Cited

U.S. PATENT DOCUMENTS

| | | | |
|---|---|---|---|
| 2023/0142570 A1* | 5/2023 | Ansley .............. | H04W 74/0875 370/329 |
| 2023/0262786 A1* | 8/2023 | Montemurro ....... | H04W 74/085 370/329 |
| 2024/0007933 A1* | 1/2024 | Nayak .............. | H04W 52/0216 |
| 2024/0040663 A1* | 2/2024 | Nayak .................. | H04W 76/50 |

OTHER PUBLICATIONS

"4. General description; 4.3 Components of the IEEE Std 802.11 architecture", IEEE P802.11be/D1.4, Jan. 2022, pp. 51-60.

EEE P802.11be-D2.0; IEEE P802.11be™/D2.0 Draft; Standard for Information technology—Telecommunications and information exchange between systems Local and metropolitan area networks—Specific requirements; "Part 11: Wireless LAN Medium Access Control (MAC) and Physical Layer (PHY) Specifications—Amendment 8: Enhancements for extremely high throughput (EHT)"; May 2022, 873 pages.

IEEE Standards Association; IEEE Std 802.11-2020; IEEE Standard for Information Technology—Telecommunications and Information Exchange between Systems—Local and Metropolitan Area Networks—Specific Requirements; "Part 11: Wireless LAN Medium Access Control (MAC) and Physical Layer (PHY) Specifications"; Dec. 3, 2020; 4379 pages.

International Search Report and Written Opinion issued Oct. 20, 2023 regarding International Application No. PCT/KR2023/010823, 7 pages.

Wullert et al., "Resolution of EPCS-related CIDs in clause 4.5.13 (CC 266)", IEEE 802.11 Documents, IEEE 802.11-22-1015r2, Jul. 2022, 6 pages.

Wullert et al., "Resolution of CIDs in clauses 9.4.2.313.2 and 9.6.35 related to EPCS (LB266)", IEEE 802.11 Documents, IEEE 802.11-22-1180r2, Aug. 2022, 5 pages.

Wullert et al., "Resolution of CIDs in clause 3.1 related to EPCS (CC 266)", IEEE 802.11 Documents, IEEE 802.11-22-1014r1, Jul. 2022, 4 pages.

Das et al., "Emergency Preparedness Communication Service (EPCS*): Background and Proposal", IEEE 802.11 Documents, IEEE 802.11-22-0658r0, May 2022, 12 pages.

* cited by examiner

500

502

504

Priority
Level
Changed?

No

Continue with same
EPCS parameters

Yes

AP transmits an unsolicited EPCS
parameter update to the device
on any of the links set up
between the AP and the device

506

700

702

AP supports service type based prioritization?

No

704

Continue with same EPCS parameters

Yes

706

For each defined or setup service type, create an EPCS operation parameter set (e.g., enhanced EDCA parameter set) that can provide the relevant priority level

708

Transmit EPCS operation parameters in a frame to the device on any of the links set up between the AP and the device

800

METHODS AND APPARATUS FOR PRIORITIZATION HANDLING FOR EPCS OPERATION

CROSS-REFERENCE TO RELATED APPLICATION AND CLAIM OF PRIORITY

This application claims priority under 35 U.S.C. § 119(e) to U.S. Provisional Patent Application No. 63/395,241 filed on Aug. 4, 2022, which is hereby incorporated by reference in its entirety.

TECHNICAL FIELD

This disclosure relates generally to transmission efficiency in wireless communications systems that include multi-link devices. Embodiments of this disclosure relate to methods and apparatuses for prioritization handling for emergency preparedness communication services (EPCS) operation.

BACKGROUND

Wireless local area network (WLAN) technology allows devices to access the internet in the 2.4 GHz, 5 GHz, 6 GHz, or 60 GHz frequency bands. WLANs are based on the Institute of Electrical and Electronic Engineers (IEEE) 802.11 standards. The IEEE 802.11 family of standards aim to increase speed and reliability and to extend the operating range of wireless networks.

Multi-link operation (MLO) is a feature that is currently being developed by the standards body for next generation extremely high throughput (EHT) Wi-Fi systems in IEEE 802.11be. The Wi-Fi devices that support MLO are referred to as multi-link devices (MLD). With MLO, it is possible for a non-access point (AP) multi-link device (MLD) to discover, authenticate, associate, and set up multiple links with an AP MLD. Channel access and frame exchange is possible on each link between the AP MLD and non-AP MLD.

SUMMARY

Embodiments of the present disclosure provide methods and apparatuses for prioritization handling for EPCS operation.

In one embodiment, a non-AP device is provided, comprising: a station (STA) comprising a transceiver configured to: form a link with an AP, and receive information associated with emergency preparedness communication services (EPCS) from the AP. The non-AP device further comprises a processor operably coupled to the transceiver. The processor is configured to: determine whether the STA and the AP support an EPCS operation; based on determining that the STA and the AP support the EPCS operation, determine whether the AP supports prioritization for EPCS devices; when the AP does not support prioritization for EPCS devices, perform the EPCS operation; and when the AP supports prioritization for EPCS devices, perform a prioritized EPCS operation, wherein the prioritized EPCS operation comprises prioritization among EPCS devices.

In another embodiment, an AP device is provided, comprising: a transceiver configured to: form a link with a STA, and transmit information associated with EPCS to the STA. The AP device further includes a processor operably coupled to the transceiver. The processor is configured to: determine whether the AP and the STA support an EPCS operation; based on determining that the AP and the STA support the EPCS operation, determine whether the AP supports prioritization for EPCS devices; when the AP does not support prioritization for EPCS devices, perform the EPCS operation; and when the AP supports prioritization for EPCS devices, perform a prioritized EPCS operation, wherein the prioritized EPCS operation comprises prioritization among EPCS devices.

In yet another embodiment, a method for wireless communication performed by a non-AP device that comprises a STA comprises: forming a link with an AP; receiving information associated with EPCS from the AP; determining whether the STA and the AP support an EPCS operation; based on determining that the STA and the AP support the EPCS operation; determining whether the AP supports prioritization for EPCS devices; when the AP does not support prioritization for EPCS devices, performing the EPCS operation; and when the AP supports prioritization for EPCS devices, performing a prioritized EPCS operation, wherein the prioritized EPCS operation comprises prioritization among EPCS devices.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: IEEE P802.11be/D2.0, 2022; IEEE std. 802.11-2020.

Embodiments of the present disclosure provide mechanisms for prioritization handling for EPCS operation.

Figure 1:
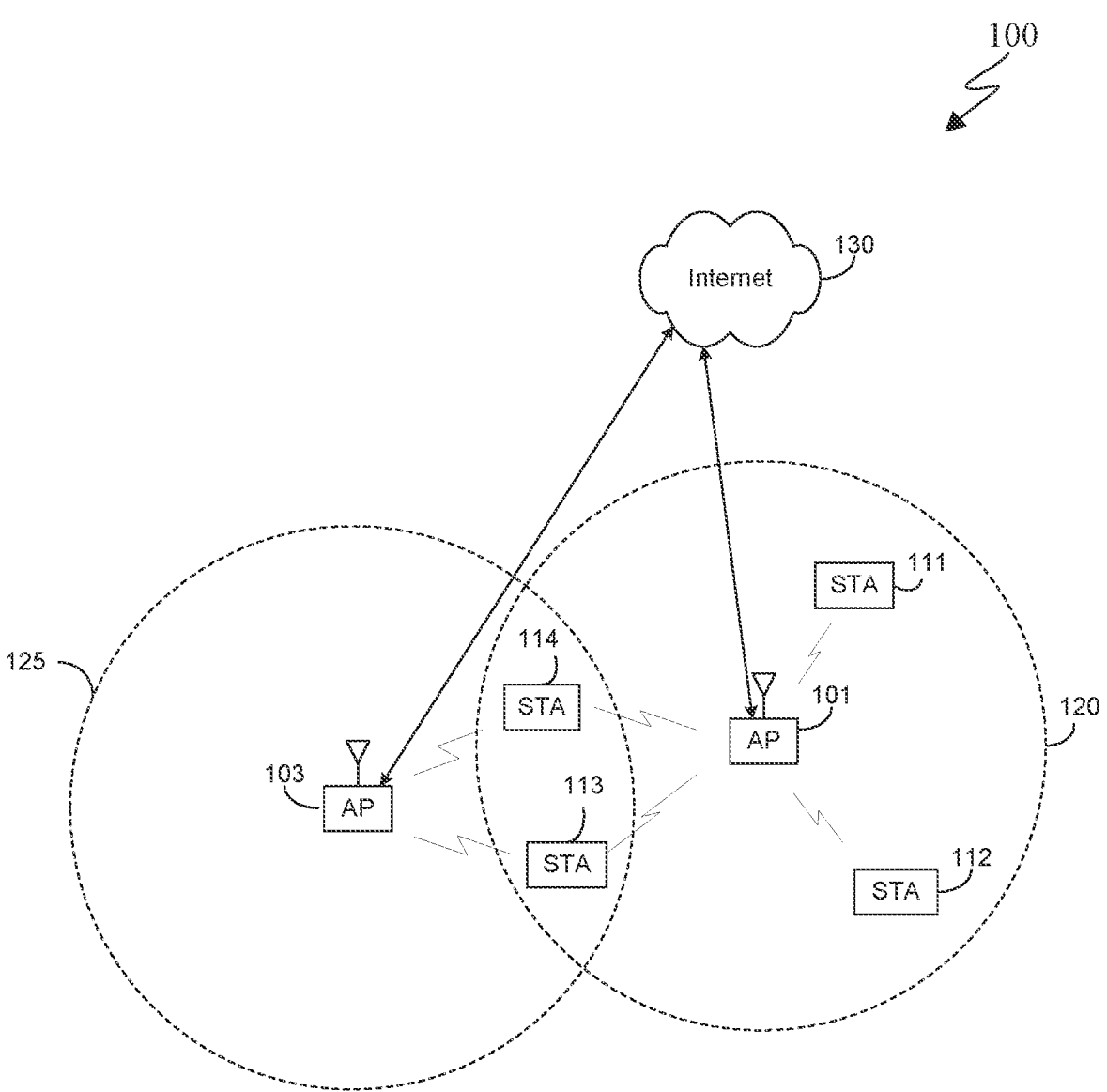
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes APs 101 and 103. The APs 101 and 103 communicate with at least one network 130, such as the Internet, a proprietary Internet Protocol (IP) network, or other data network. The AP 101 provides wireless access to the network 130 for a plurality of STAs 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA (e.g., an AP STA). Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.). This type of STA may also be referred to as a non-AP STA.

In various embodiments of this disclosure, each of the APs 101 and 103 and each of the STAs 111-114 may be an MLD. In such embodiments, APs 101 and 103 may be AP MLDs, and STAs 111-114 may be non-AP MLDs. Each MLD is affiliated with more than one STA. For convenience of explanation, an AP MLD is described herein as affiliated with more than one AP (e.g., more than one AP STA), and a non-AP MLD is described herein as affiliated with more than one STA (e.g., more than one non-AP STA).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for prioritization handling for EPCS operation. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
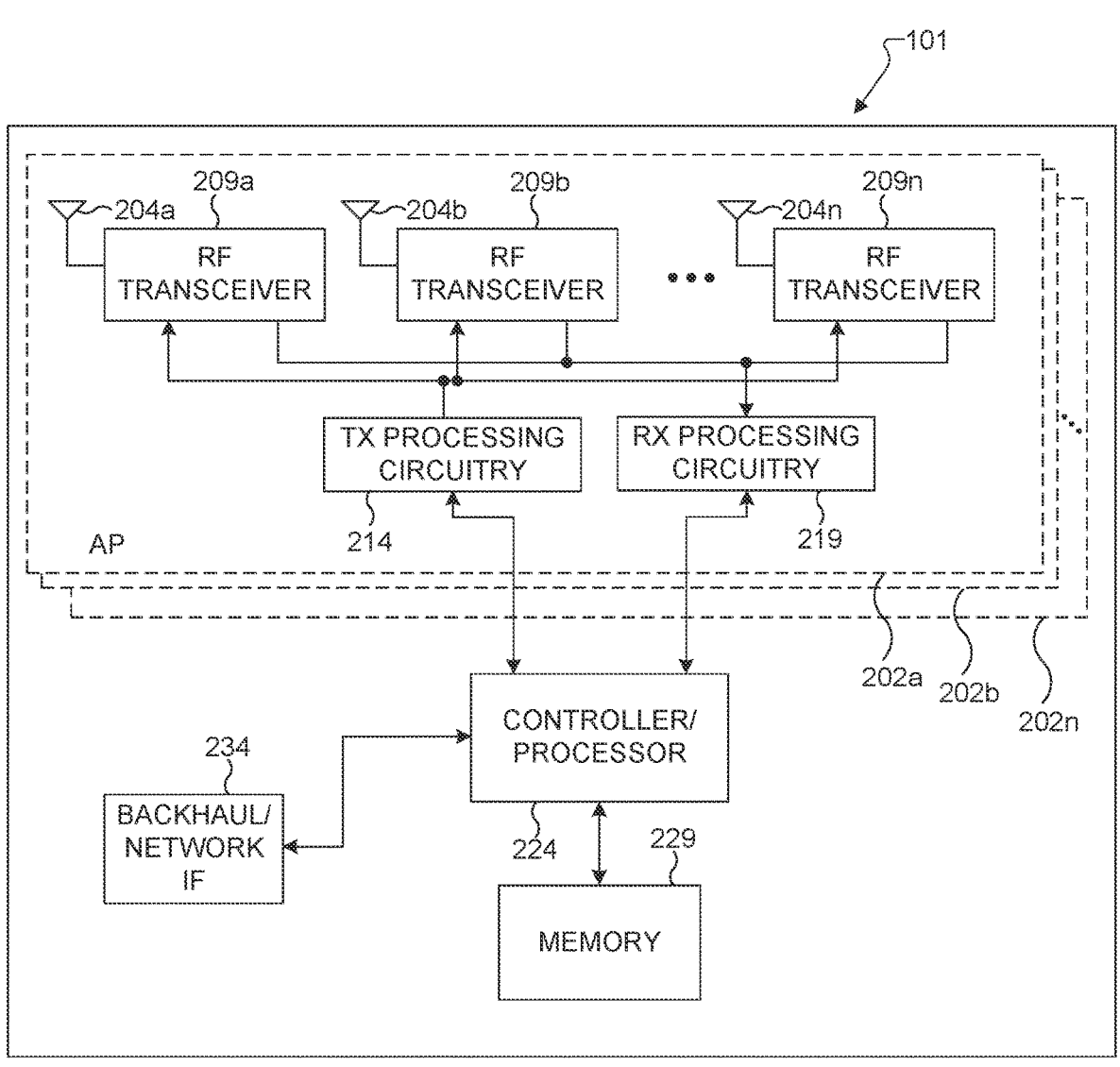
FIG. 2A illustrates an example AP according to embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. In the embodiments discussed herein below, the AP 101 is an AP MLD. However, APs come in a wide variety of configurations, and FIG. 2A does not limit the scope of this disclosure to any particular implementation of an AP.

The AP MLD 101 is affiliated with multiple APs 202a-202n (which may be referred to, for example, as AP1-APn). Each of the affiliated APs 202a-202n includes multiple antennas 204a-204n, multiple RF transceivers 209a-209n, transmit (TX) processing circuitry 214, and receive (RX) processing circuitry 219. The AP MLD 101 also includes a controller/processor 224, a memory 229, and a backhaul or network interface 234.

The illustrated components of each affiliated AP 202a-202n may represent a physical (PHY) layer and a lower media access control (LMAC) layer in the open systems interconnection (OSI) networking model. In such embodiments, the illustrated components of the AP MLD 101 represent a single upper MAC (UMAC) layer and other higher layers in the OSI model, which are shared by all of the affiliated APs 202a-202n.

For each affiliated AP 202a-202n, the RF transceivers 209a-209n receive, from the antennas 204a-204n, incoming RF signals, such as signals transmitted by STAs in the network 100. In some embodiments, each affiliated AP 202a-202n operates at a different bandwidth, e.g., 2.4 GHz, 5 GHz, or 6 GHz, and accordingly the incoming RF signals received by each affiliated AP may be at a different frequency of RF. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

For each affiliated AP 202a-202n, the TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-convert the baseband or IF signals to RF signals that are transmitted via the antennas 204a-204n. In embodiments wherein each affiliated AP 202a-202n operates at a different bandwidth, e.g., 2.4 GHz, 5 GHz, or 6 GHz, the outgoing RF signals transmitted by each affiliated AP may be at a different frequency of RF.

The controller/processor 224 can include one or more processors or other processing devices that control the overall operation of the AP MLD 101. For example, the controller/processor 224 could control the reception of forward channel signals and the transmission of reverse channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP MLD 101 by the controller/processor 224 including prioritization handling for EPCS operation. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP MLD 101 to communicate with other devices or systems over a backhaul connection or over a network. The interface 234 could support communications over any suitable wired or wireless connection(s). For example, the interface 234 could allow the AP MLD 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP MLD 101 may include circuitry and/or programming for prioritization handling for EPCS operation. Although FIG. 2A illustrates one example of AP MLD 101, various changes may be made to FIG. 2A. For example, the AP MLD 101 could include any number of each component shown in FIG. 2A. As a particular example, an AP MLD 101 could include a number of interfaces 234, and the controller/processor 224 could support routing functions to route data between different network addresses. As another particular example, while each affiliated AP 202a-202n is shown as including a single instance of TX processing circuitry 214 and a single instance of RX processing circuitry 219, the AP MLD 101 could include multiple instances of each (such as one per RF transceiver) in one or more of the affiliated APs 202a-202n. Alternatively, only one antenna and RF transceiver path may be included in one or more of the affiliated APs 202a-202n, such as in legacy APs. Also, various components in FIG. 2A could be combined, further subdivided, or omitted and additional components could be added according to particular needs.

Figure 2B:
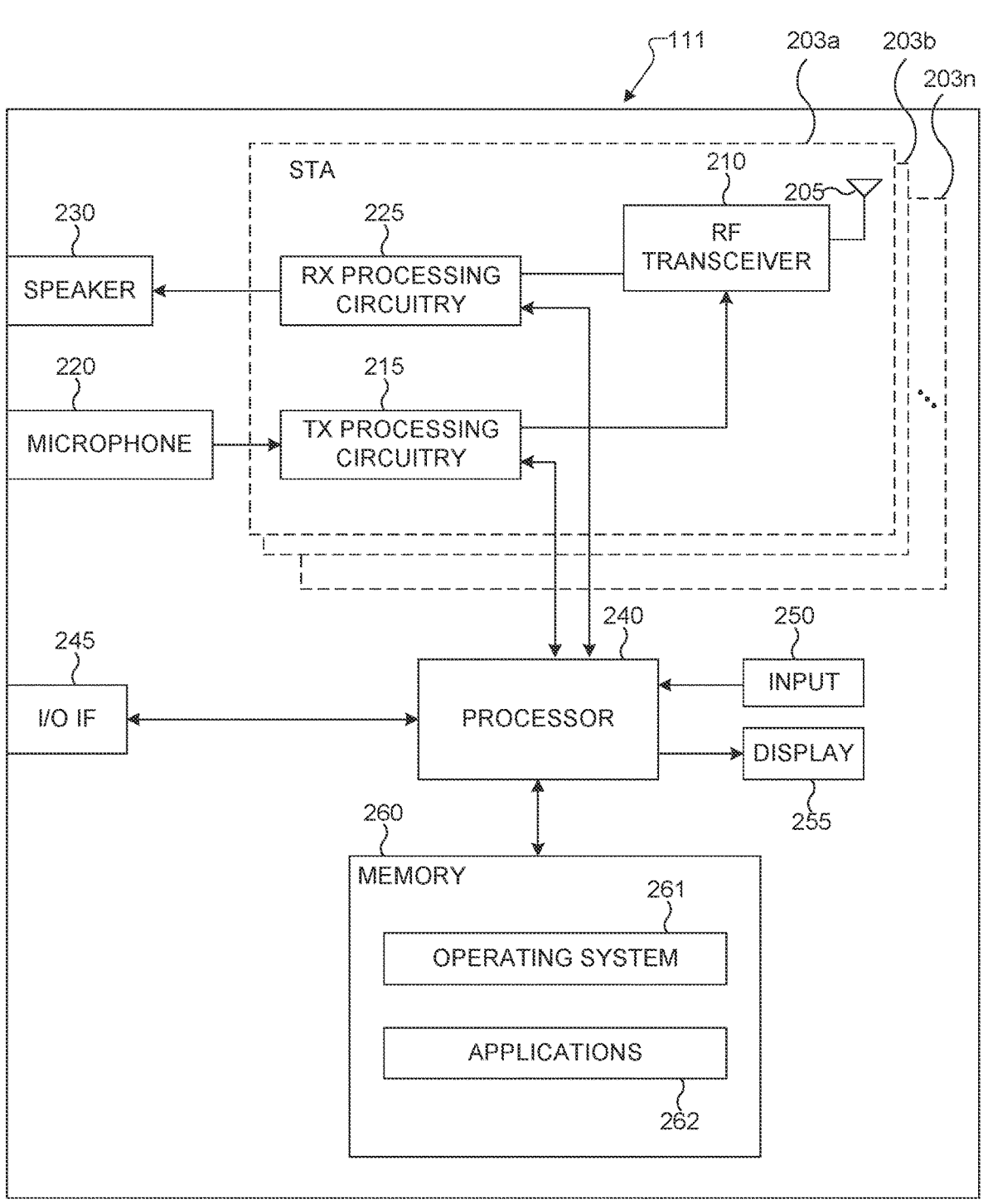
FIG. 2B illustrates an example STA according to embodiments of the present disclosure.

FIG. 2B illustrates an example STA 111 according to various embodiments of this disclosure. The embodiment of the STA 111 illustrated in FIG. 2B is for illustration only, and the STAs 111-115 of FIG. 1 could have the same or similar configuration. In the embodiments discussed herein below, the STA 111 is a non-AP MLD. However, STAs come in a wide variety of configurations, and FIG. 2B does not limit the scope of this disclosure to any particular implementation of a STA.

The non-AP MLD 111 is affiliated with multiple STAs 203a-203n (which may be referred to, for example, as STA1-STAn). Each of the affiliated STAs 203a-203n includes antenna(s) 205, a radio frequency (RF) transceiver 210, TX processing circuitry 215, and receive (RX) processing circuitry 225. The non-AP MLD 111 also includes a microphone 220, a speaker 230, a controller/processor 240, an input/output (I/O) interface (IF) 245, a touchscreen 250, a display 255, and a memory 260. The memory 260 includes an operating system (OS) 261 and one or more applications 262.

The illustrated components of each affiliated STA 203a-203n may represent a PHY layer and an LMAC layer in the OSI networking model. In such embodiments, the illustrated components of the non-AP MLD 111 represent a single UMAC layer and other higher layers in the OSI model, which are shared by all of the affiliated STAs 203a-203n.

For each affiliated STA 203a-203n, the RF transceiver 210 receives from the antenna(s) 205, an incoming RF signal transmitted by an AP of the network 100. In some embodiments, each affiliated STA 203a-203n operates at a different bandwidth, e.g., 2.4 GHz, 5 GHz, or 6 GHz, and accordingly the incoming RF signals received by each affiliated STA may be at a different frequency of RF. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

For each affiliated STA 203a-203n, the TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205. In embodiments wherein each affiliated STA 203a-203n operates at a different bandwidth, e.g., 2.4 GHz, 5 GHz, or 6 GHz, the outgoing RF signals transmitted by each affiliated STA may be at a different frequency of RF.

The controller/processor 240 can include one or more processors and execute the basic OS program 261 stored in the memory 260 in order to control the overall operation of the non-AP MLD 111. In one such operation, the main controller/processor 240 controls the reception of forward channel signals and the transmission of reverse channel signals by the RF transceiver 210, the RX processing circuitry 225, and the TX processing circuitry 215 in accordance with well-known principles. The main controller/processor 240 can also include processing circuitry configured to support prioritization handling for EPCS operation. In some embodiments, the controller/processor 240 includes at least one microprocessor or microcontroller.

The controller/processor 240 is also capable of executing other processes and programs resident in the memory 260, such as operations for supporting prioritization handling for EPCS operation. The controller/processor 240 can move data into or out of the memory 260 as required by an executing process. In some embodiments, the controller/processor 240 is configured to execute a plurality of applications 262, such as applications for supporting prioritization handling for EPCS operation. The controller/processor 240 can operate the plurality of applications 262 based on the OS program 261 or in response to a signal received from an AP. The main controller/processor 240 is also coupled to the I/O interface 245, which provides non-AP MLD 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the non-AP MLD 111 can use the touchscreen 250 to enter data into the non-AP MLD 111. The display 255 may be a liquid crystal display, light emitting diode display, or other display capable of rendering text and/or at least limited graphics, such as from web sites. The memory 260 is coupled to the controller/processor 240. Part of the memory 260 could include a random-access memory (RAM), and another part of the memory 260 could include a Flash memory or other read-only memory (ROM).

Although FIG. 2B illustrates one example of non-AP MLD 111, various changes may be made to FIG. 2B. For example, various components in FIG. 2B could be combined, further subdivided, or omitted and additional components could be added according to particular needs. In particular examples, one or more of the affiliated STAs 203a-203n may include any number of antenna(s) 205 for MIMO communication with an AP 101. In another example, the non-AP MLD 111 may not include voice communication or the controller/processor 240 could be divided into multiple processors, such as one or more central processing units (CPUs) and one or more graphics processing units (GPUs). Also, while FIG. 2B illustrates the non-AP MLD 111 configured as a mobile telephone or smartphone, non-AP MLDs can be configured to operate as other types of mobile or stationary devices.

Emergency telecommunication services have been implemented in a number of countries with the objective of providing prioritized access in the times of disasters or emergencies. Examples of such telecommunication services in the united states include government emergency telecommunication service (GETS), wireless priority service (WPS), next generation network priority services (NGN priority services), telecommunications service priority (TSP), etc. Such services have also been implemented in other countries. Examples of such services include blue light mobile service in Belgium, mobile telecommunications privileged access scheme in Great Britain, disaster priority telephone in Japan, etc. Typically, such services are subscription based, operator controlled, enabled through global standards and are offered over commercial network infrastructure.

In recent times there has been a growing need for such services over Wi-Fi networks. In IEEE 802.11be, Emergency preparedness communication services (EPCS) has been introduced with the goal of providing prioritized access to certain authorized users. As a part of this service, the user that has associated with an AP can be authorized by the AP to take advantage of EPCS service. Once authorized, the user can use an enhanced EDCA parameter set with values for parameters such as CWmin[AC], CWmax[AC], AIFSN [AC], TXOP[AC], etc. which are different from those for other STAs associated with the same AP. With this enhanced EDCA parameter set, the non-AP MLD that is authorized by the AP, benefits from prioritized access as it can capture the channel faster compared to other users in the network. After EPCS is disabled, the non-AP MLD can update its EDCA parameter set to match that of other non-EPCS users in the network.

Various embodiments of the present disclosure recognize that in the current EPCS operation, when any non-AP MLD/non-AP STA is enabled for EPCS priority access, the AP MLD/AP assigns an enhanced EDCA parameter set to the non-AP MLD/non-AP STA. This enhanced EDCA parameter set is designed such that the non-AP MLD/non-AP STA is able to capture the channel faster as compared to non-EDCA devices. Consequently, the non-AP MLD/non-AP STA gains a higher priority compared to other regular non-AP MLDs/non-AP STAs in the network. However, there is no further differentiation amongst the EPCS authorized devices based on the priority levels as they are all assigned the same EDCA parameter set. This can cause a problem in some scenarios.

Accordingly, various embodiments of the present disclosure provide mechanisms for prioritization handling amongst EPCS devices.

Figure 3:
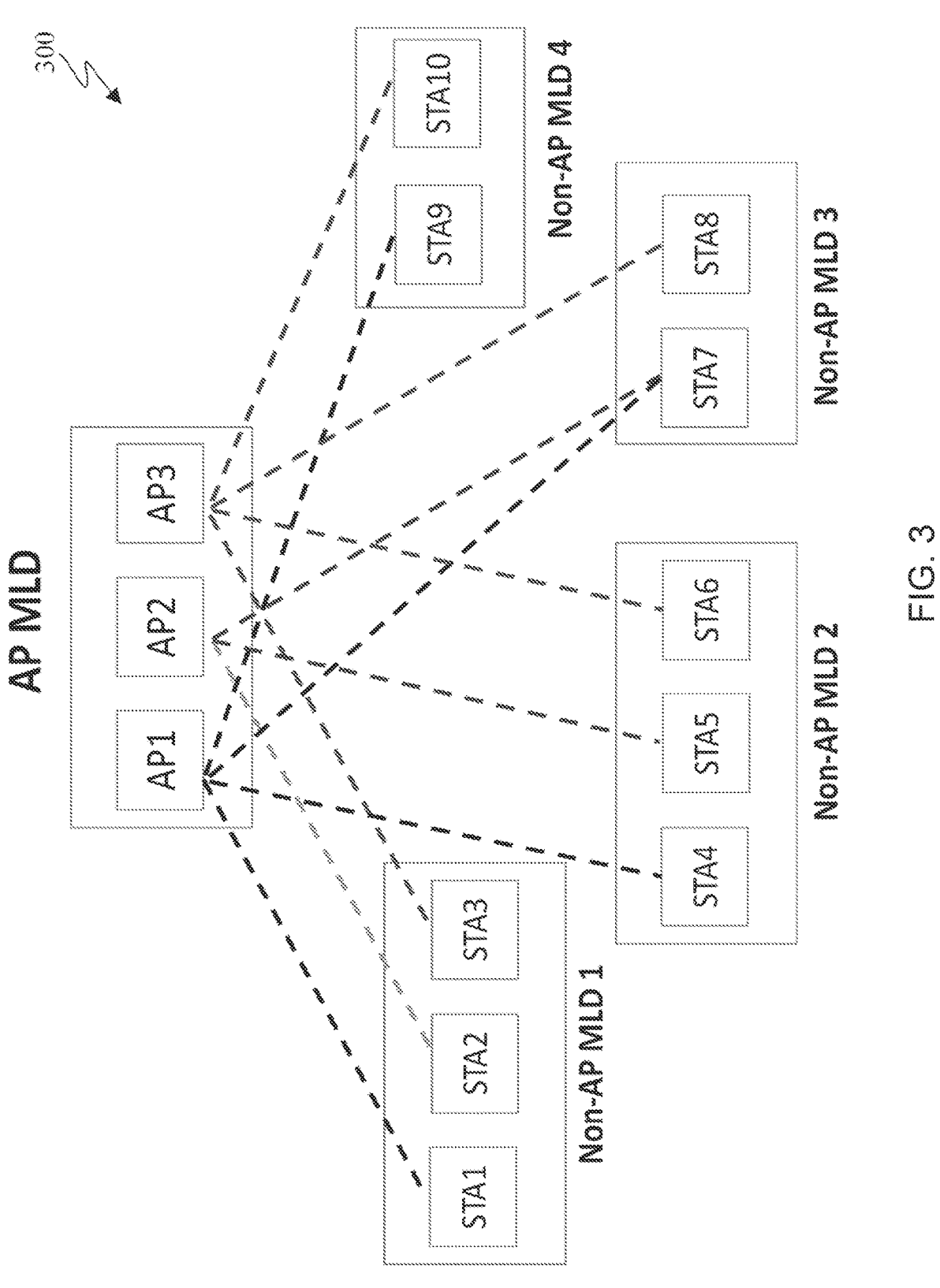
FIG. 3 illustrates an example ECPS prioritization scenario according to embodiments of the present disclosure.

FIG. 3 illustrates an example ECPS prioritization scenario 300 according to embodiments of the present disclosure. The embodiment of the example ECPS prioritization scenario 300 shown in FIG. 3 is for illustration only. Other embodiments of the example ECPS prioritization scenario 300 could be used without departing from the scope of this disclosure.

In the current EPCS operation, when any non-AP MLD/ non-AP STA is enabled for EPCS priority access, the AP MLD/AP assigns an enhanced EDCA parameter set to the non-AP MLD/non-AP STA. This enhanced EDCA parameter set is designed such that the non-AP MLD/non-AP STA is able to capture the channel faster as compared to non-EDCA devices. Consequently, the non-AP MLD/non-AP STA gains a higher priority compared to other regular non-AP MLDs/non-AP STAs in the network. However, there is no further differentiation amongst the EPCS authorized devices based on the priority levels as they are all assigned the same EDCA parameter set. This can cause a problem in some scenarios.

Consider the scenario as depicted in FIG. 3, which shows an AP MLD which has three APs affiliated with it. These APs are referred to as AP1, AP2 and AP3. Further, there can be multiple non-AP MLDs that can be associated with the AP MLD and can have a varying number of STAs affiliated with them as shown in the figure.

One or more of these non-AP MLDs can be EPCS capable and can get authorized by using the EPCS priority access enable procedure in the standard. If the number of such non-AP MLDs that request and get authorized for EPCS operation increases, the priority level acquired via the use of the enhanced EDCA parameter set may not be very beneficial to the device eventually. In the example illustrated in FIG. 3, let us consider that non-AP MLD 1-4 are all EPCS capable and one by one gain authorization for EPCS operation to benefit from higher priority levels compared to other devices in the network. Eventually when all the devices (or most of them) acquire EPCS authorization, the situation will be similar to the original one wherein they all had the same priority level, and the device may not benefit from EPCS authorization.

There can be multiple types of services that could be using EPCS priority access. Based on their own unique characteristics, the priority level requirements of different services could be different. For example, emergency voice services may need a higher priority compared to normal voice services. Consequently, even if a device is EPCS authorized, its requirements may not be as urgent (or may be more urgent) as compared to other EPCS authorized devices in the network that are running services that need higher priority.

Consequently, the AP MLD may want to establish EPCS priority access operation with different priority levels to different EPCS authorized devices depending on their own requirements.

Figure 4:
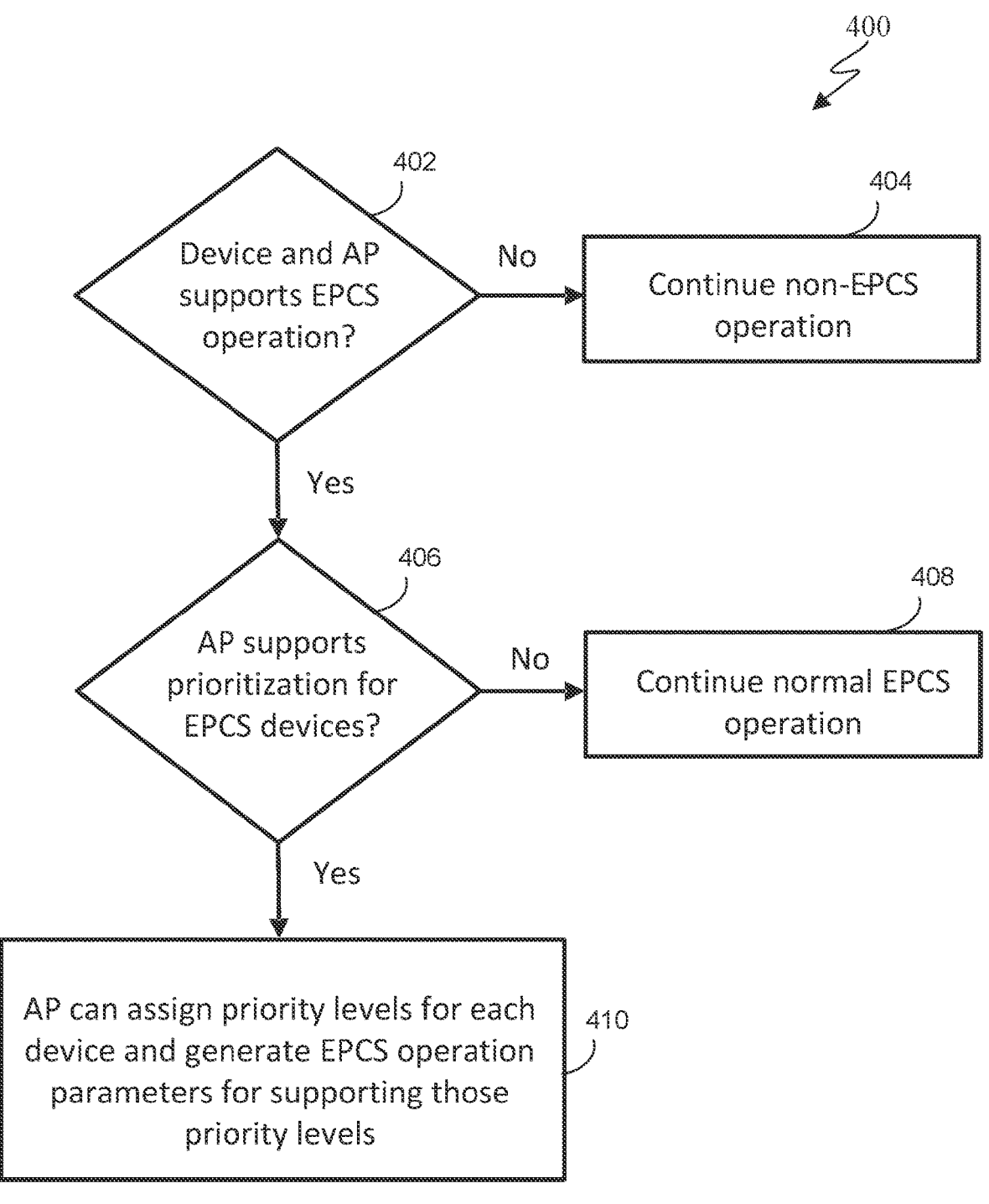
FIG. 4 illustrates an example prioritization method for EPCS operation according to embodiments of the present disclosure.

FIG. 4 illustrates an example prioritization method 400 for EPCS operation according to embodiments of the present disclosure. The embodiment of the example prioritization method 400 for EPCS operation shown in FIG. 4 is for illustration only. Other embodiments of the example prioritization method 400 for EPCS operation could be used without departing from the scope of this disclosure.

As illustrated in FIG. 4, the method 400 begins at step 402, where a determination is made whether both a device and an AP support EPCS operation. If both the device and the AP do not support EPCS operation, then at step 404, non-EPCS operation is continued. If both the device and the AP support EPCS operation, then at step 406, a determination is made whether the AP supports prioritization of EPCS devices. If the AP does not support EPCS prioritization, then at step 408, normal EPCS operation is continued. If the AP does support EPCS prioritization, then at step 410, the AP may assign priority levels for each device and generate EPCS operation parameters for supporting those priority levels.

According to one embodiment, each device that supports EPCS operation can be assigned a priority level as shown in FIG. 4 (a device here can refer to a non-AP STA or a non-AP MLD or a non-AP STA affiliated with a non-AP MLD). This level can be used to perform prioritization amongst EPCS devices (note that the priority level of non-EPCS devices is lower as compared to EPCS devices). For instance, when the EPCS priority access is performed by providing an enhanced EDCA parameter set, the priority level can determine the values in the EDCA parameter set that is assigned to a device. In the example in FIG. 3, if non-AP MLD1 is assigned a higher priority compared to non-AP MLD2, then the EDCA parameter set assigned to non-AP MLD1 will be such that it can obtain channel access with a higher probability compared to non-AP MLD2. If, however, EPCS priority access is being employed for triggering based operation and non-AP MLD1 is assigned a higher priority level as compared to non-AP MLD2, then the AP will prioritize non-AP MLD1 over non-AP MLD2 for triggering.

When the network comprises EPCS and non-EPCS devices, according to this embodiment, when the AP makes a scheduling decision (e.g., scheduling downlink traffic, allocation of resources for uplink transmissions, etc.), the EPCS device traffic will receive higher priority as compared to traffic of non-EPCS devices.

This priority level can be assigned by any one entity involved in EPCS authorization procedure (e.g., the SSPN interface, the AP, etc.). In another embodiment, the priority level can be assigned by interaction between one or more than one entity involved in the EPCS authorization procedure (e.g., by information exchange between the AP and the device, the priority level can be determined by the AP or by information exchange between the AP and the device, the priority level can be determined by a further interaction between the AP and the SSPN interface).

The priority level for a device can be maintained at the SSPN and can be communicated to the AP. The AP can either request the priority level from the SSPN (e.g., during association or EPCS authorization) or the SSPN can send unsolicited messages to the AP to inform the AP about the priority level assigned to the device. The priority level assigned to a device can be kept fixed or can be dynamically varied (e.g., depending on the network condition, device requirements, etc.).

Further, priority levels can be explicitly assigned (for instance, priority levels can be explicitly assigned as numerical integers (1 being highest priority level and each incrementing integer value indicating a reduction in the priority level)). Alternatively, priority levels can be implicitly assigned. For example, higher priority level devices can be assigned a particular EPCS operation parameter set (e.g., EDCA parameter set) and lower priority level devices can be assigned a particular EPCS operation parameter set. Further, the operation parameters set assigned to higher priority devices can be designed such that they are able to capture the channel faster compared to the lower priority devices. Thus, priority levels can be implicitly assigned to different devices.

Figure 5:
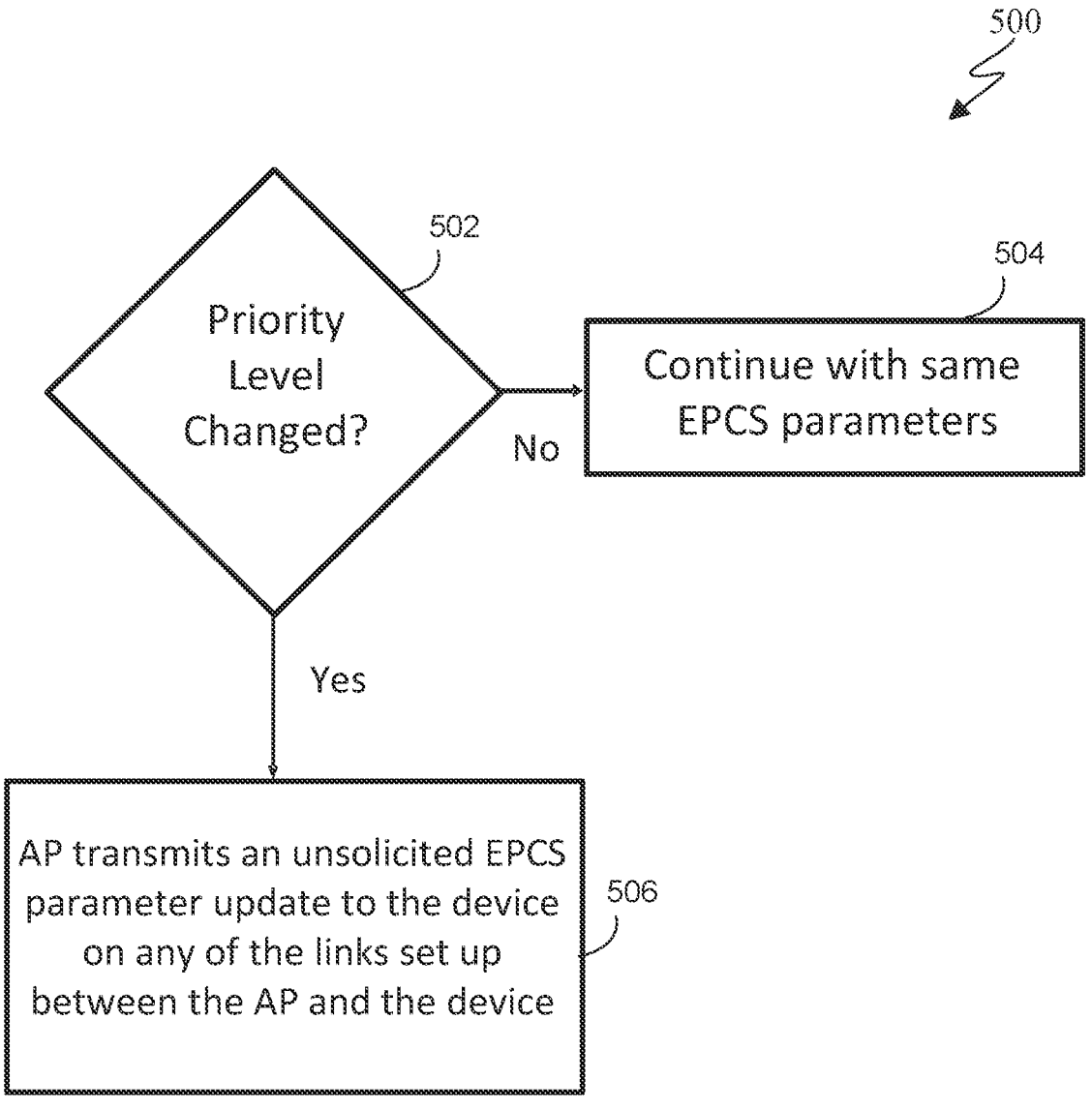
FIG. 5 illustrates an example unsolicited EPCS parameter/priority update method according to embodiments of the present disclosure.

FIG. 5 illustrates an example unsolicited EPCS parameter/priority update method 500 according to embodiments of the present disclosure. The embodiment of the example unsolicited EPCS parameter/priority update method 500 shown in FIG. 5 is for illustration only. Other embodiments of the example unsolicited EPCS parameter/priority update method 500 could be used without departing from the scope of this disclosure.

As illustrated in FIG. 5, the method 500 begins at step 502, where a determination is made whether a priority level s changed. If the priority level has not been changed, then at step 504, operation continues with the same parameters. If the priority level has been changed, then at step 506, the AP transmits an unsolicited EPCS parameter update to the device on any of the links set up between the AP and the device.

In one embodiment, a device identifier based prioritization can be employed. This device identifier can be mapped to the user of the device. For instance, the devices of executive government staff can be given higher priority compared to those of regular government staff. The device identifier can be a unique identifier that can differentiate the device from other devices. For instance, the MAC address of the device can be used as a device identifier. Based on this unique device identifier, the AP can assign different priority level to different devices. The unique device identifier and their corresponding priority level can be maintained at the SSPN and can also be cached at the AP. Based on the priority level, the AP can assign an appropriate EDCA parameter set to enable the device to gain more priority over other EPCS authorized devices.

According to one embodiment, a device's priority level can be assigned at the time of setup and then until tear down the device can maintain the same priority level. According to another embodiment, the device priority level can be changed dynamically after EPCS setup is complete. An example scenario in which such a dynamic priority level change can be beneficial can be one in which the network condition changes, and the priority levels of some devices needs to be degraded to support the performance of some high priority devices. According to another embodiment, a hybrid approach can be followed wherein for some devices the priority levels are fixed and for some they vary dynamically.

The device priority level can be assigned/changed by any of the entities involved in the EPCS authorization procedure (e.g., the AP, SSPN or the device itself (e.g., based on user login)) or can be assigned/changed by an interaction between one or more entities involved in the EPCS authorization procedure (e.g., interaction between the device and the AP and the AP and the SSPN interface).

According to one embodiment, when the device priority level is assigned/changed by the AP or the SSPN, the AP can inform the device in a frame transmitted on any of the links set up between the AP and the device about the priority level assigned or the new priority level when the priority level changes.

The frame can contain one or more of the information mentioned in Table 1.

TABLE 1

| Information contained in the frame transmitted by the AP to the device to inform the device about the change in its priority level | |
|---|---|
| Information field | Description |
| Priority level indicator | A field to describe the priority level that is assigned to the device. Priority level can either be on a per device level or can be one per link per device level. For instance, if priority levels are defined as numerical integers (1 being highest priority level and each incrementing integer value indicating a reduction in the priority level), then this field can indicate the value that has been assigned to the device. If priority levels are assigned on a per link per device basis then a link indicator can be included as described below and the priority level indicator can contain multiple priority levels each corresponding to the links indicated by the link indicator. |

TABLE 1-continued

| Information contained in the frame transmitted by the AP to the device to inform the device about the change in its priority level | |
|---|---|
| Information field | Description |
| Link indicator | A link indicator to indicate which link's priority level information has been indicated in the priority level indicator field. For instance, the link indicator can be a bitmap indicating the links for which the priority levels are being indicated by the priority level indicator and the priority level indicator can have priority level information for each link in the link indicator. In one example, the priority level indicator can have priority levels in the same order in which the links are marked in the bitmap. Therefore, priority levels can be mapped to each link in the bitmap based on the order of occurrence in the priority level indicator field. In one embodiment, when the link(s) setup between the device and the AP are not indicated in the link indicator field, they can continue to use the priority levels and the corresponding EPCS operation parameters previously assigned. In another embodiment, if such links are not assigned any priority levels/not EPCS authorized, they can use the normal EDCA parameter set. |
| Category | Action field category definition (e.g., EHT) |
| Protected EHT Action | Defining the type of action that is being requested (e.g., EPCS priority level update) |
| Dialog Token | A token for matching the action responses with the action requests. |
| Reason code | A code to indicate the reason for sending the frame. For instance, an example of a reason to send the frame could be dynamic priority level change or change in EPCS operation parameters corresponding to a priority level due to a change in the network condition. |
| Duration of priority level assignment | The duration for which the priority levels indicated in the priority level indicator hold true. Following this duration, either the AP can send another frame to the device, or the device can request a frame from the AP. |
| EPCS operation parameters | Parameters that are assigned to the device for EPCS operation. For example, the enhanced EDCA parameter set. The parameters assigned to the device can either be on a per device basis or on a per link per device basis depending on whether the priority levels are indicated on a per device basis or a per link per device basis. The parameters can be determined by the AP such that the device gets the priority level that is indicated in the priority level indicator field or implicitly assigned by the AP. |
| Priority access multi-link element | Priority access multi-link element containing the EPCS operation parameters. |

The AP can transmit one or more of the information fields in Table 1 to the device at the time of association, during EPCS setup, when requested by the device or in an unsolicited manner. After setup, the AP can also broadcast the information in Table 1 for providing updates to the device. In this case, each device can upgrade its operation parameters based on priority levels that have been assigned by the AP previously.

Figure 6:
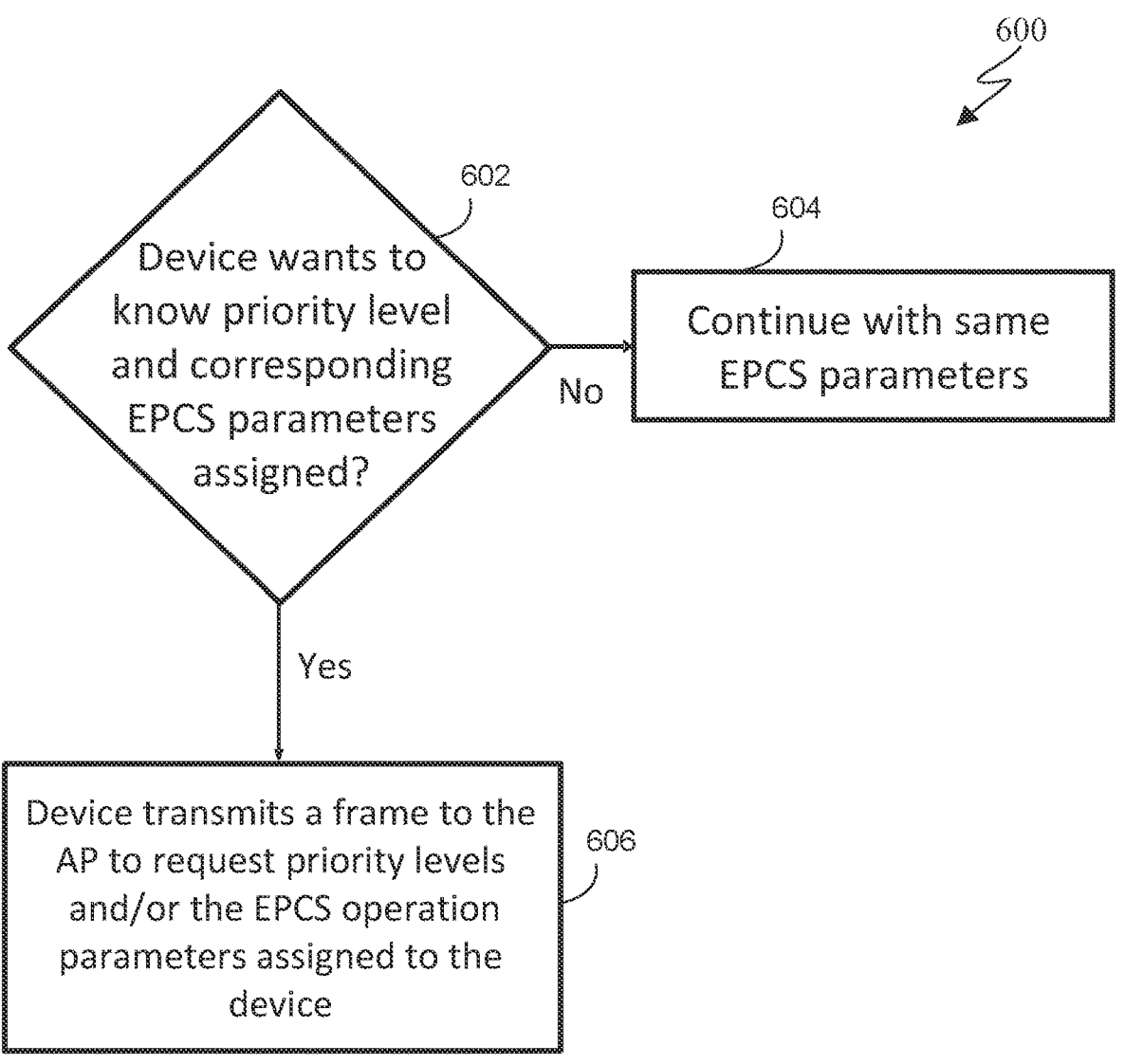
FIG. 6 illustrates an example of a method performed by a device to request priority levels and EPCS operation parameters according to embodiments of the present disclosure.

When the device requests one or more of the information fields in Table 1, the device can transmit a frame containing one or more of the information fields indicated in Table 2 and the procedure is depicted in FIG. 6.

FIG. 6 illustrates an example of a method 600 performed by a device to request priority levels and EPCS operation parameters according to embodiments of the present disclosure. The embodiment of the example method 600 performed by a device to request priority levels and EPCS operation parameters shown in FIG. 6 is for illustration only. Other embodiments of the example method 600 performed by a device to request priority levels and EPCS operation parameters could be used without departing from the scope of this disclosure.

As illustrated in FIG. 6, the method 600 begins at step 602, where a determination is made whether a device wants to know the priority level and corresponding EPCS parameters assigned. If the device does not want to know the priority level and corresponding EPCS parameters assigned, then at step 604, operation continues with the same EPCS parameters. If the device wants to know the priority level and corresponding EPCS parameters assigned, then at step 606, the device transmits a frame to the AP to request priority levels and/or the EPCS parameters assigned to the device.

TABLE 2

| Information contained in the frame transmitted by the device to the AP to request priority levels assigned to the device | |
|---|---|
| Information field | Description |
| Priority level indicator | A field to describe the priority level that is being requested by the device. An example scenario in which device can request for a priority level is one in which the device already has a certain priority level and still continues to face poor performance with |

TABLE 2-continued

Information contained in the frame transmitted by the device to the AP to request
priority levels assigned to the device

| Information field | Description |
|---|---|
| | that priority level and wants to request for an upgrade. Priority level can either be on a per device level or can be one per link per device level. For instance, if priority levels are defined as numerical integers (1 being highest priority level and each incrementing integer value indicating a reduction in the priority level), then this field can indicate the value that has been assigned to the device. If priority levels are assigned on a per link per device basis then a link indicator can be included as described below and the priority level indicator can contain multiple priority levels each corresponding to the links indicated by the link indicator. |
| Link indicator | A link indicator to indicate which link's priority level information has been indicated in the priority level indicator field (for the remaining link(s) setup between the device and the AP, the device can continue the same priority levels and operation parameters). For instance, the link indicator can be a bitmap indicating the links for which the priority levels are being indicated by the priority level indicator and the priority level indicator can have priority level information for each link in the link indicator. In one example, the priority level indicator can have priority levels in the same order in which the links are marked in the bitmap. Therefore, priority levels can be mapped to each link in the bitmap based on the order of occurrence in the priority level indicator field. |
| Category | Action field category definition (e.g., EHT) |
| Protected EHT Action | Defining the type of action that is being requested (e.g., EPCS priority level update) |
| Dialog Token | A token for matching the action responses with the action requests. |
| Reason code | A code to indicate the reason for sending the frame. For instance, an example of a reason to send the frame can be to request for priority level information or EPCS operation parameters. |
| Duration of priority level assignment | The duration for which the priority levels indicated in the priority level indicator are being requested. Following this duration, either the device can send another request frame to the AP, or the AP can send an unsolicited frame containing one or more of the information indicated in Table 1 to the device in an unsolicited manner. |
| EPCS operation parameters | Parameters that are assigned to the device for EPCS operation. For example, the enhanced EDCA parameter set. The parameters assigned to the device can either be on a per device basis or on a per link per device basis. |
| Priority access multi-link element | Priority access multi-link element containing the EPCS operation parameters. |

In one embodiment, when the AP receives a request from the device containing one or more information fields indicated in Table 2, it can process the requests of higher priority devices first. In another embodiment, the AP can process request frames on a first come first serve basis. When a device sends a request frame containing one or more of the information fields indicated in Table 2 and if request is rejected by the AP, the STA can try again after some time.

Figure 7:
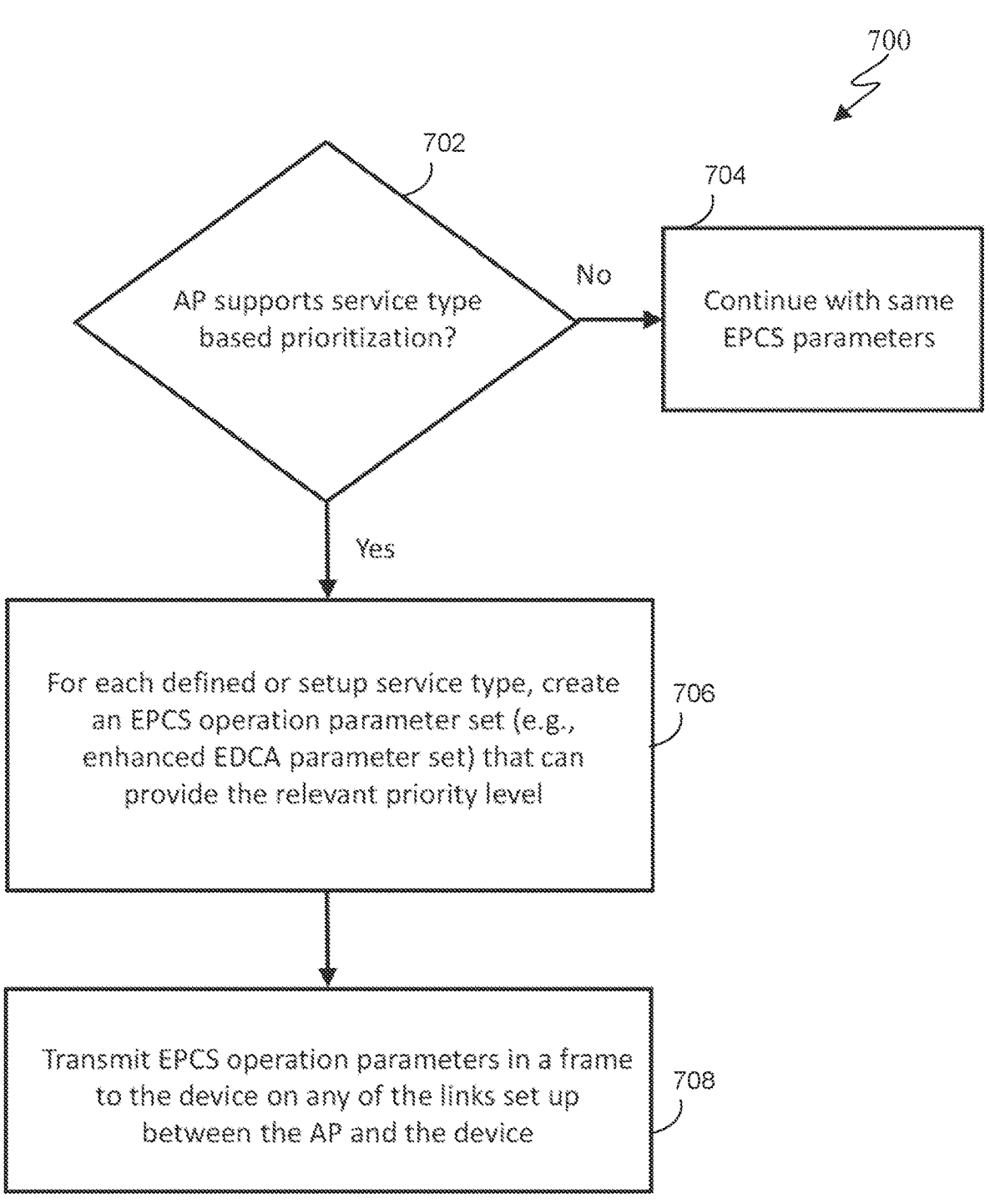
FIG. 7 illustrates an example of a method performed by an AP for supporting service type based prioritization according to embodiments of the present disclosure.

FIG. 7 illustrates an example of a method 700 performed by an AP for supporting service type based prioritization according to embodiments of the present disclosure. The embodiment of the example method 700 performed by an AP for supporting service type based prioritization shown in FIG. 7 is for illustration only. Other embodiments of the example method 700 performed by an AP for supporting service type based prioritization could be used without departing from the scope of this disclosure.

As illustrated in FIG. 7, the method begins at step 702, where a determination is made whether the AP supports service type based prioritization. If the AP does not support service type based prioritization, then at step 704, operation continues with the same EPCS parameters. If the AP supports service type based prioritization, then at step 706, for each defined or setup service type, the AP creates an EPCS operation parameter set (e.g., an enhanced EDCA parameter set) that can provide the relevant priority level. At step 708, the AP transmits EPCS operation parameters in a frame to the device on any of the links setup between the AP and the device.

In another embodiment, prioritization can be done based on the service type as shown in FIG. 7. Further, according to this embodiment, each service can have a service type identifier which can provide an indication of the type of service (e.g., alpha numeric keys, TID). Priority levels can be assigned based on this service type identifier.

In one embodiment, the service type identifiers can be unique and determined by the standard. Example categories of service types can include but may not be limited to emergency voice services, video camera feeds, real time sensor feeds, file download, video conferencing, etc. Further, according to this embodiment, priority levels can be assigned explicitly or implicitly to these pre-determined categories based on their own unique characteristics (e.g., traffic pattern) and their requirements (e.g., latency tolerance). Further, the priority levels can be also assigned on a per service per link basis.

The priority levels assigned to each service type can be determined by any of the entities involved in EPCS operation (e.g., the AP, the SSPN interface or the end device) or by an interaction between one or more of these entities.

In one embodiment, the device can inform the AP about the service type that it is running or intends to run by transmitting a frame containing one or more of the information fields indicated in Table 3.

TABLE 3

Information contained in frame transmitted by the device to the AP to inform the
AP about the service type that the STA is running or intends to run

| Information field | Description |
|---|---|
| Service type identifier(s) | Information on which service types the device intends to run and wants priority levels assigned for EPCS operation. For instance, the frame can contain a set of service type identifiers corresponding to each of the services that the device is running as a part of the EPCS operation. |
| Duration of service(s) | For the service type(s) indicated by the service type identifier, information on how long the service will be executed or alternatively how long the higher priority level will be needed. For instance, this value can be provided in terms of the number of TBTT/TUs. |
| Link identifier(s) | The links on which each of the service type identifier will be running and hence the priority levels will apply to these links. For instance, this can be the link IDs for each of the service type identifiers. |
| Priority level indication(s) | Indication on the priority level(s) that the device requests for the service types indicated by the service type identifier(s) and link identifier(s). The indication can also be provided on a per service per link basis. |
| Reason code | A code to explain the reason for the request that the device is making. For instance, an example of a reason to send the frame can be to request higher priority levels for the indicated services due to poor performance that the device is currently experiencing when running them. |
| Category | Action field category definition (e.g., EHT) |
| Protected EHT Action | Defining the type of action that is being requested (e.g., EPCS priority level update) |
| Dialog Token | A token for matching the action responses with the action requests. |
| EPCS operation parameters | Set of EPCS operation parameters (e.g., EDCA parameter set) that the device is currently using for the service types indicated by the service type identifier field. This indication can also be given on a per service per link basis. |
| Priority access multi-link element | Priority access multi-link element containing the EPCS operation parameters. |

The information in Table 3 can also be included in any of the existing frames in the standard (e.g., EPCS priority access enable request frame).

Figure 8:
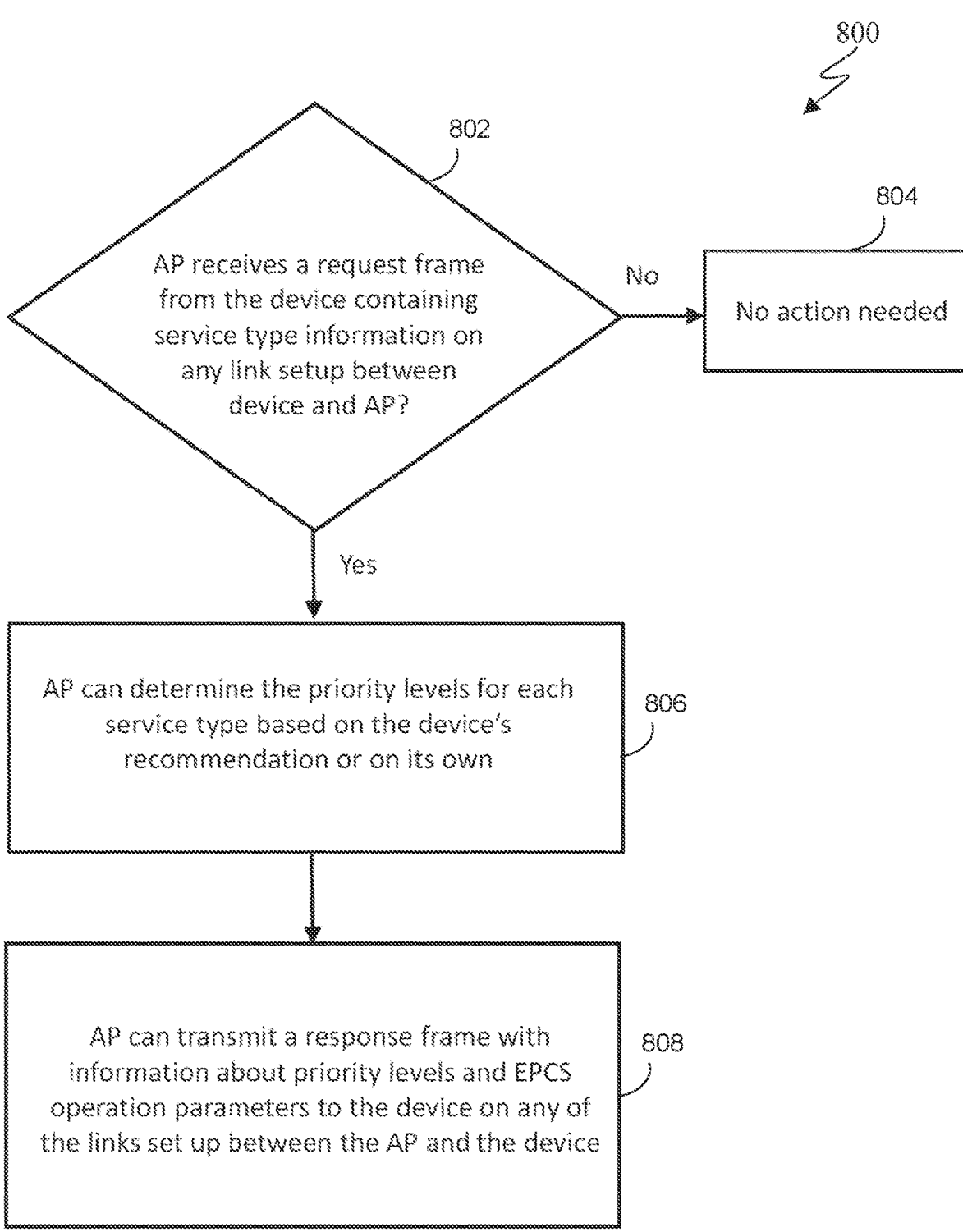
FIG. 8 illustrates an example of a method performed by an AP for supporting service type based prioritization and response according to embodiments of the present disclosure.

FIG. 8 illustrates an example of a method 800 performed by an AP for supporting service type based prioritization and response according to embodiments of the present disclosure. The embodiment of the example method 800 performed by an AP for supporting service type based prioritization and response shown in FIG. 8 is for illustration only. Other embodiments of the example method 800 performed by an AP for supporting service type based prioritization and response could be used without departing from the scope of this disclosure.

As illustrated in FIG. 8, the method begins at step 802, where a determination is made whether the AP receives a request frame from the device containing service type information on any link setup between the device and the AP. If the AP does not receive such a request frame, then at step 804, no action is needed. If the AP does receive such a request frame, then at step 806, the AP can determine the priority levels for each service type based on the device's recommendation or on its own. At step 808, the AP can transmit a response frame with information about priority levels and ECPS operation parameters to the device on any of the links setup between the AP and the device.

Upon receiving the above information, the AP can determine the priority levels for the service types indicated in the frame above (either on its own or by using the device's recommendation) and can transmit a frame containing one or more of the information indicated in Table 4 and the procedure depicted in FIG. 8. Further, the AP can also transmit a frame containing the information indicated in Table 4 to the device in an unsolicited manner or in a broadcast manner to all devices. When advertised in a broadcast manner, the device can update the EPCS operation parameters depending on the priority levels previously assigned or the service type identifier information indicated in the frame.

TABLE 4

Information contained in a frame transmitted by the AP to the device

| Information field | Description |
|---|---|
| Service type identifier(s) | Information on which service types that qualify for prioritization under EPCS operation. For instance, the frame can contain a set of service type identifiers corresponding to each of the services that qualify for prioritization under EPCS operation. |

TABLE 4-continued

| Information contained in a frame transmitted by the AP to the device | |
|---|---|
| Information field | Description |
| Duration of prioritization(s) | For the service type(s) indicated by the service type identifier, information on how long the service can use the higher priority level assigned to it. For instance, this value can be provided in terms of the number of TBTT/TUs. |
| Link identifier(s) | The links on which each of the service type identifier will be running and hence the priority levels will apply to these links. For instance, this can be the link IDs for each of the service type identifiers. |
| Priority level indication(s) | Indication on the priority level(s) that have been assigned for the service types indicated by the service type identifier(s). The indication can also be provided on a per service per link basis. |
| Reason code | A code to explain the reason for the response from the AP. For instance, unsolicited frame sent to update the EPCS operation parameters/priority levels for each service type or alternatively frames sent as response to request frames received from the device. |
| Category | Action field category definition (e.g., EHT) |
| Protected EHT Action | Defining the type of action that is being requested (e.g., EPCS priority level update) |
| Dialog Token | A token for matching the action responses with the action requests. |
| EPCS operation parameters | Set of EPCS operation parameters (e.g., EDCA parameter set) that the AP assigns for the service types indicated by the service type identifier field. This indication can also be given on a per service per link basis. |
| Priority access multi-link element | Priority access multi-link element containing the EPCS operation parameters. |

The information in Table 4 can also be included in any of the existing frames in the standard (e.g., EPCS priority access enable response frame).

The request and response frames can be transmitted on any of the links setup between the AP and the device.

Figure 9:
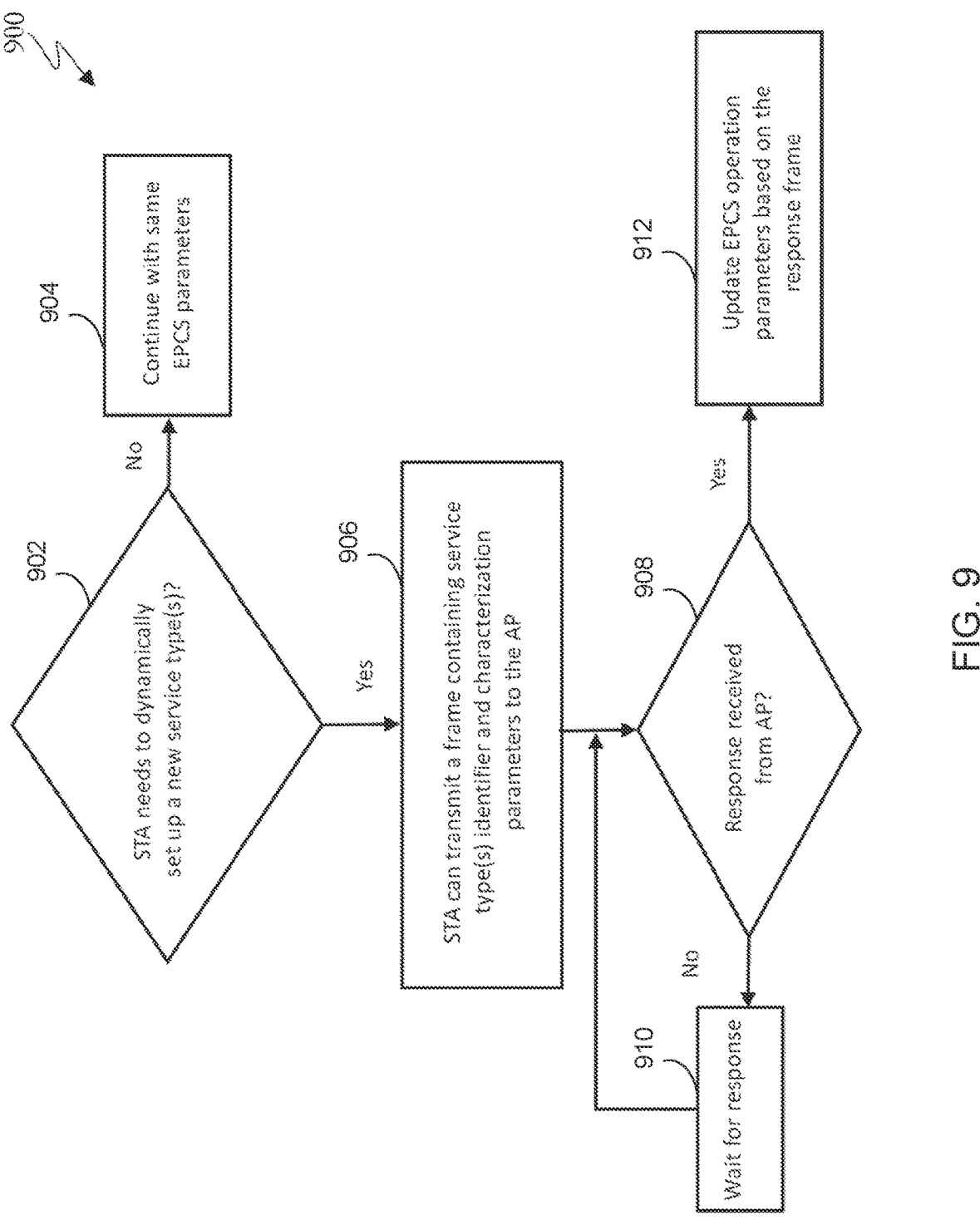
FIG. 9 illustrates an example of a method performed by a STA for dynamic service type setup with the AP for EPCS operation according to embodiments of the present disclosure.

FIG. 9 illustrates an example of a method 900 performed by a STA for dynamic service type setup with the AP for EPCS operation according to embodiments of the present disclosure. The embodiment of the example method 900 performed by a STA for dynamic service type setup with the AP for EPCS operation shown in FIG. 9 is for illustration only. Other embodiments of the example method 900 performed by a STA for dynamic service type setup with the AP for EPCS operation could be used without departing from the scope of the present disclosure.

As illustrated in FIG. 9, the method begins at step 902, where a determination is made whether the STA needs to dynamically setup a new service type. If the STA does not need to dynamically setup a new service type, then at step 904, operation continues with the same ECPS parameters. If the STA needs to dynamically setup a new service type, then at step 906, the STA can transmit a frame containing a service type identifier and characterization parameters to the AP. At step 908, a determination is made whether a response is received from the AP. If a response is not received from the AP, then at step 910, the STA waits for a response. If a response is received from the AP, then at step 912, the EPCS operation parameters are update based on the response frame.

In another embodiment, the device can dynamically setup new service types and convey their requirements to the AP by using the procedure illustrated in FIG. 9. This can be done by transmitting a frame to the AP containing one or more of the information indicated in Table 5.

TABLE 5

| Information fields present in frame transmitted by the device to the AP to setup a new service type | |
|---|---|
| Information field | Description |
| Service type identifier(s) | A unique identifier(s) that is generated by the device as an indicator for the service(s) that the device intends to setup the prioritization for/run as a part of the EPCS operation. E.g., a unique integer number for each new service type, TID, etc. |
| Link identifier(s) | The link(s) on which the services identified by the service type identifier(s) field will be running. For instance, this can be the link ID(s) for the link(s) for each of the service type(s). |
| Service characterization | A field containing one or more parameters that characterize the service(s). E.g., the traffic pattern for the service type, the rate of packet generation, packet size, burst length, etc. This can either be for each service or on a per service per link basis. |
| Service requirement | A field containing one or more parameters that characterize the performance that service(s) needs. E.g., throughput requirements, latency requirements, etc. This can either be for each service or on a per service per link basis. |
| Duration(s) | The duration for which this request can be considered valid. Alternatively, this can also be a set of durations indicated on a per service type per link basis. |

When the AP receives a frame from the device containing one or more of the above information, it can register the new service type and can send a response frame to the STA containing one or more of the following information.

TABLE 6

Information fields present in frame transmitted by the AP to the device after a new service type has been setup

| Information field | Description |
|---|---|
| Service type identifier(s) | The unique identifier(s) that is generated by the device as an indicator for the service(s) that the device intends to setup the prioritization for/run as a part of the EPCS operation. E.g., a unique integer number for each new service type, TID, etc. The AP can insert the set of unique identifier(s) that were setup between the AP and the device. Alternatively, the AP can provide a list of all the service type identifier(s) that are currently active between the device and the AP. |
| Link identifier(s) | The link(s) on which the services identified by the service type identifier(s) field have been setup. For instance, this can be the link ID(s) for the link(s) for each of the service type(s). |
| Service characterization | A field containing one or more parameters that characterize the service(s). E.g., the traffic pattern for the service type, the rate of packet generation, packet size, burst length, etc. This can either be for each service or on a per service per link basis. |
| Service requirement | A field containing one or more parameters that characterize the performance that the AP can support for the service(s). E.g., throughput requirements, latency requirements, etc. This can either be for each service or on a per service per link basis. |
| Duration(s) | The duration for which this response can be considered valid. Alternatively, this can also be a set of durations indicated on a per service type per link basis. |

The AP and the device can setup the service type by transmitting frames containing the information indicated in Table 5 and 6 on any of the links setup between the AP and the device. Further, the information can also be included in any of the frames that are defined in the standards.

In another embodiment, there can be a hybrid mode of operation in which a set of services can be predefined as indicated in the static service type definition section and there can also be a support for setting up new service types as indicated in dynamic service type setup.

In another embodiment, the AP can also assign priority levels based on the modes that the device runs (e.g., EMLSR, NSTR, etc.). Based on the knowledge of the mode, the AP can determine the EPCS priority level that is necessary for a device in order for it to better performance in the current network setup.

Consequently, when considering the priority level that needs to be assigned to a device the AP can consider the mode of operation of the device as well as the mode of operation of other devices in the network and determine EPCS operation parameters that can provide the relevant priority level to the device during EPCS operation.

The AP can use one of the above prioritization methods or can combine one or more types together.

In another embodiment, a link based prioritization can be used. According to this embodiment, the device can indicate which links need a higher priority and the AP can process the request and assign accordingly. For example, the device may be experiencing higher congestion on some of the links compared to other links.

Figure 10:
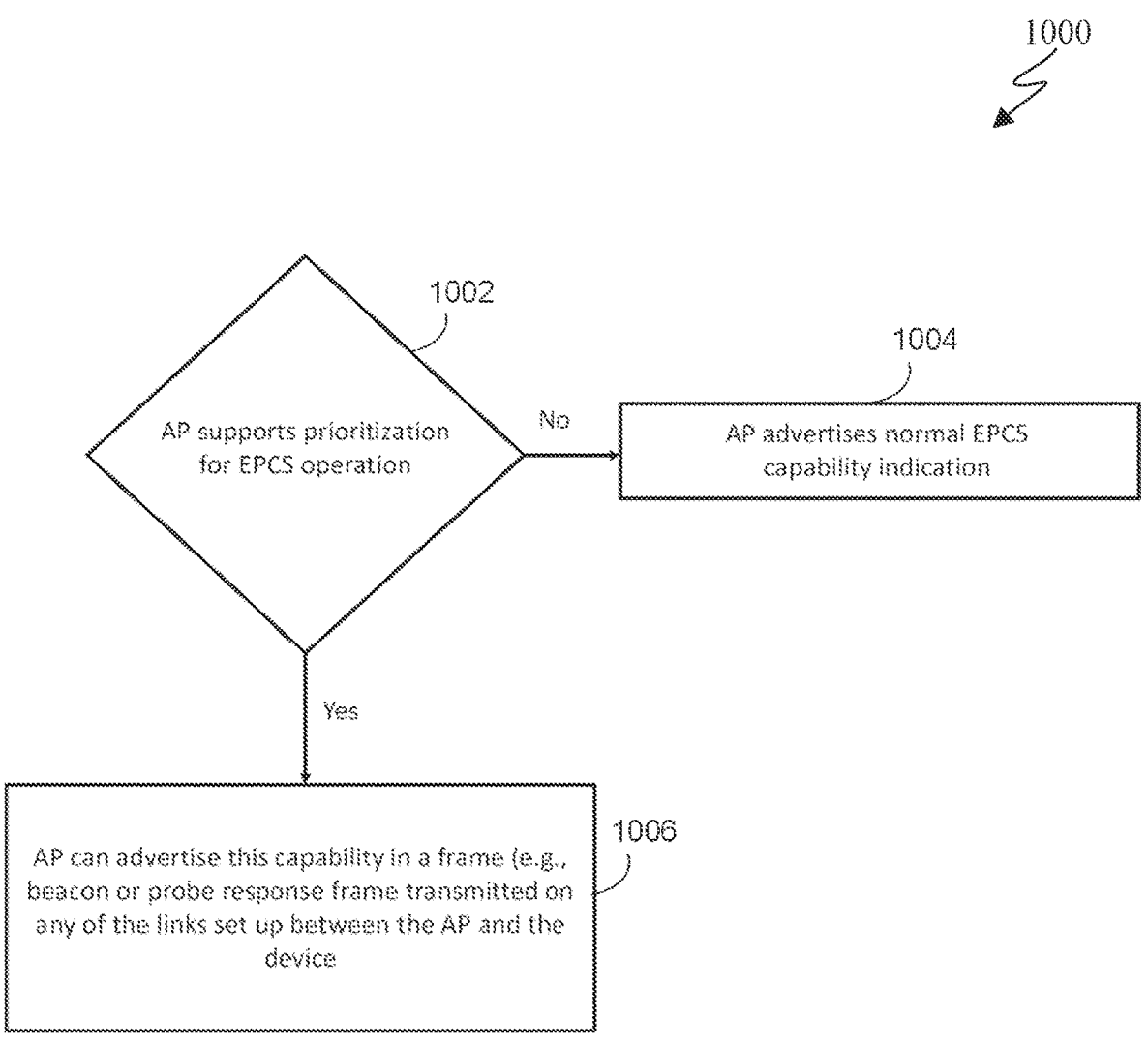
FIG. 10 illustrates an example of a method performed by an AP that supports prioritization for capability advertisement according to embodiments of the present disclosure.

FIG. 10 illustrates an example of a method 1000 performed by an AP that supports prioritization handling for EPCS operation. The embodiment of the example method 1000 performed by an AP that supports prioritization handling for EPCS operation shown in FIGURE is for illustration only. Other embodiments of the example method 1000 performed by an AP that supports prioritization handling for EPCS operation could be used without departing from the scope of the present disclosure.

As illustrated in FIG. 10, the method begins at step 1002, where a determination is made whether the AP supports prioritization for EPCS operation. If the AP does not support prioritization for EPCS operation, then at step 1004, the AP advertises a normal or conventional EPCS operation. If the AP supports prioritization for EPCS operation, then at step 1006, the AP can advertise this capability in a frame (e.g., beacon or probe response frame) transmitted on any of the links setup between the AP and the device.

If an AP supports the prioritization for EPCS operation (or any of the above prioritization for EPCS operation), it can advertise this capability in frames that it transmits to the device as shown in FIG. 10. Examples of such frames include beacon and probe response frames. Based on this indication, a device can know if the AP supports prioritization or only normal EPCS mode as currently defined in the standard.

Figure 11:
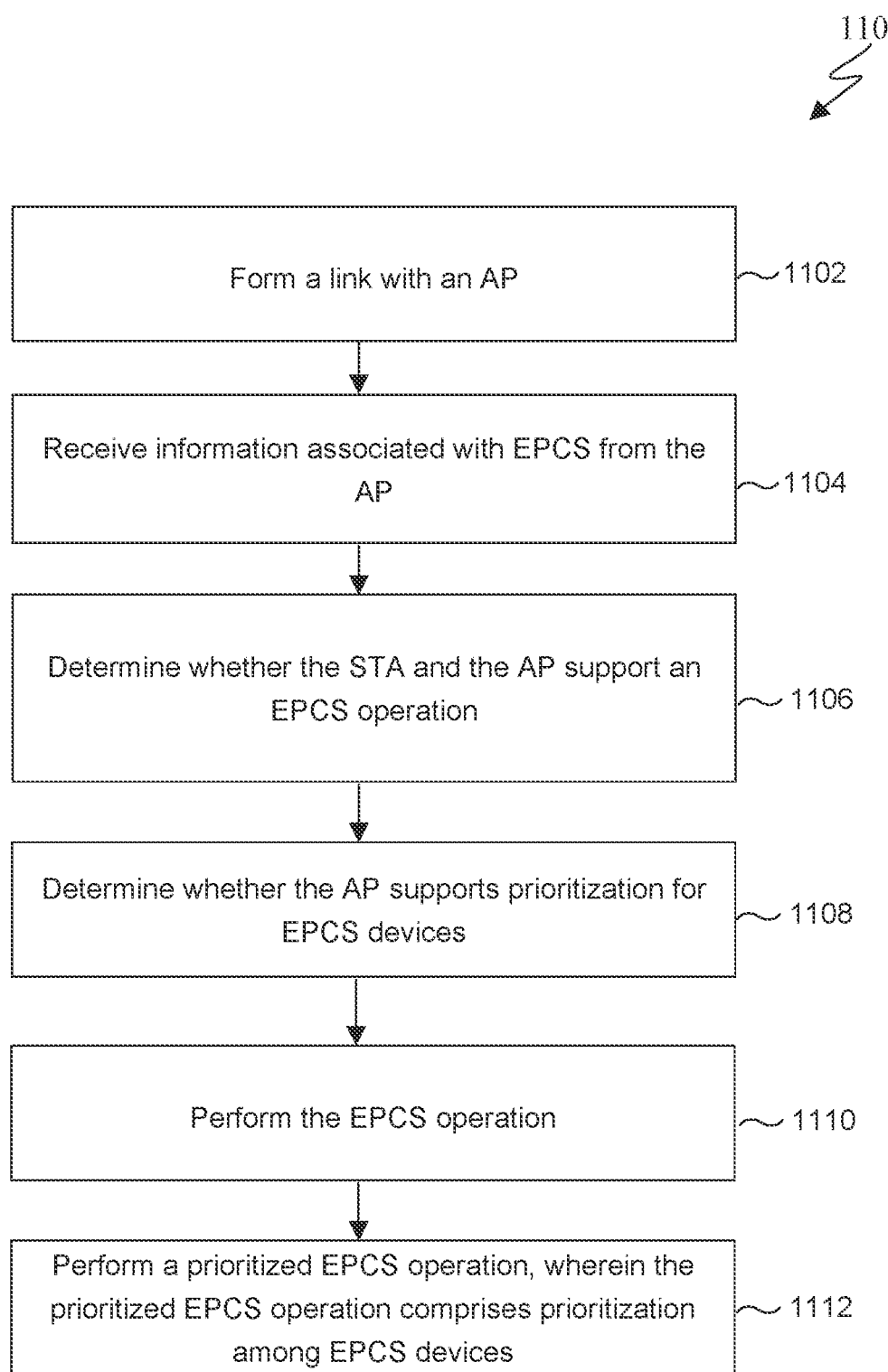
FIG. 11 illustrates an example of a method for wireless communication performed by a non-AP device according to embodiments of the present disclosure.

FIG. 11 illustrates an example of a method 1100 performed by a non-AP device AP that supports prioritization handling for EPCS operation. The embodiment of the example method 1100 performed by an AP that supports prioritization handling for EPCS operation shown in FIG. 11 is for illustration only. Other embodiments of the example method 1100 performed by a non-AP device that supports prioritization handling for EPCS operation could be used without departing from the scope of the present disclosure.

As illustrated in FIG. 11, the method begins at step 1102, where a link is formed with an AP. At step 1104, the non-AP device receives information associated with EPCS from the AP. At step 1106, the non-AP device determines whether the STA and the AP support an EPCS operation. At step 1108, based on determining that the STA and the AP support the EPCS operation, the non-AP device determines whether the AP supports prioritization for EPCS devices. When the AP does not support prioritization for EPCS devices, then at step 1110, the non-AP device performs the EPCS operation, and when the AP supports prioritization for EPCS devices, then at step 1112 the non-AP device performs a prioritized EPCS operation, wherein the prioritized EPCS operation comprises prioritization among EPCS devices.

In one embodiment, the AP supports prioritization for EPCS devices, and the processor is configured to identify a priority level for the STA.

In one embodiment, the priority level for the STA is based on a device identification.

In one embodiment, the non-AP device transmits, to the AP, a request for a priority level change; and receives, from the AP, a response to the request for a priority level change.

In one embodiment, the non-AP device transmits, to the AP, information associated with a mode that the STA is running or intends to run; and receives an indication associated with the priority level for the STA from the AP based on the information associated with the mode that the STA is running or intends to run.

In one embodiment, the non-AP device transmits, to the AP, information associated with link prioritization for the STA; and receives an indication associated with the priority level for the STA from the AP based on the information associated with the link prioritization for the STA.

In one embodiment, the priority level for the STA is based on a service type.

In one embodiment, the non-AP device transmits, to the AP, information associated with a service type that the STA is running or intends to run; and receives an indication associated with the priority level for the STA from the AP based on the information associated with the service type that the STA is running or intends to run.

The above flowcharts illustrate example methods that can be implemented in accordance with the principles of the present disclosure and various changes could be made to the methods or processes illustrated in the flowcharts. For example, while shown as a series of steps, various steps could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A non-access point (AP) device comprising:
a station (STA) comprising a transceiver configured to:
   form a link with an AP; and
   receive information associated with emergency preparedness communication services (EPCS) from the AP; and
a processor operably coupled to the transceiver, the processor configured to:
   based on the received information, determine whether the STA and the AP support an EPCS operation;
   based on determining that the STA and the AP support the EPCS operation, determine whether the AP supports prioritization for EPCS devices that are authorized by the AP to use the EPCS;
   when the AP does not support prioritization for the EPCS devices, perform the EPCS operation using an enhanced distributed channel access (EDCA) parameter set; and when the AP supports prioritization for EPCS devices, perform a prioritized EPCS operation using an enhanced EDCA parameter set based on a priority level for the STA included in the received information, wherein the priority level indicates a priority for performing the EPCS among the authorized EPCS devices.

2. The non-AP device of claim 1, wherein:
the AP supports prioritization for the EPCS devices, and
the processor is configured to identify the priority level for the STA.

3. The non-AP device of claim 2, wherein the priority level for the STA is based on a device identification.

4. The non-AP device of claim 2, wherein the transceiver is configured to:
transmit, to the AP, a request for a priority level change; and
receive, from the AP, a response to the request for a priority level change.

5. The non-AP device of claim 2, wherein the transceiver is configured to:
transmit, to the AP, information associated with a mode that the STA is running or intends to run; and
receive an indication associated with the priority level for the STA from the AP based on the information associated with the mode that the STA is running or intends to run.

6. The non-AP device of claim 2, wherein the transceiver is configured to:
transmit, to the AP, information associated with link prioritization for the STA; and
receive an indication associated with the priority level for the STA from the AP based on the information associated with the link prioritization for the STA.

7. The non-AP device of claim 2, wherein the priority level for the STA is based on a service type.

8. The non-AP device of claim 7, wherein the transceiver is configured to:
transmit, to the AP, information associated with a service type that the STA is running or intends to run; and
receive an indication associated with the priority level for the STA from the AP based on the information associated with the service type that the STA is running or intends to run.

9. An access point (AP) device comprising:
a transceiver configured to:
   form a link with a station (STA), and
   transmit information associated with emergency preparedness communication services (EPCS) to the STA; and
a processor operably coupled to the transceiver, the processor configured to:
   based on the transmitted information, determine whether the AP and the STA support an EPCS operation;
   based on determining that the AP and the STA support the EPCS operation, determine whether the AP supports prioritization for EPCS devices authorized by the AP to use the EPCS;
   when the AP does not support prioritization for the EPCS devices, perform the EPCS operation using an enhanced distributed channel access (EDCA) parameter set; and
   when the AP supports prioritization for EPCS devices, perform a prioritized EPCS operation using an enhanced EDCA parameter set based on a priority level for the STA included in the transmitted information, wherein the priority level indicates a priority for performing the EPCS among the authorized EPCS devices.

10. The AP device of claim 9, wherein:

the AP supports prioritization for the EPCS devices, the processor is configured to determine the priority level for the STA, and the transceiver is configured to transmit the priority level for the STA.

11. The AP device of claim 10, wherein the transceiver is further configured to:

receive, from the STA, information associated with a mode that the STA is running or intends to run; and transmit an indication associated with the priority level for the STA based on the information associated with the mode that the STA is running or intends to run.

12. The AP device of claim 10, wherein:

the priority level for the STA is based on a service type, and the transceiver is further configured to:

receive, from the STA, information associated with the service type that the STA is running or intends to run; and transmit an indication associated with the priority level for the STA based on the information associated with the service type that the STA is running or intends to run.

13. A method for wireless communication performed by a non-access point (AP) device that comprises a station (STA), the method comprising:

forming a link with an AP;

receiving information associated with emergency preparedness communication services (EPCS) from the AP;

based on the received information, determining whether the STA and the AP support an EPCS operation;

based on determining that the STA and the AP support the EPCS operation, determining whether the AP supports prioritization for EPCS devices authorized by the AP to use the EPCS;

when the AP does not support prioritization for EPCS devices, performing the EPCS operation using an enhanced distributed channel access (EDCA) parameter set; and when the AP supports prioritization for the EPCS devices, performing a prioritized EPCS operation using an enhanced EDCA parameter set based on a priority level for the STA included in the received information, wherein the priority level indicates a priority for performing the EPCS among the authorized EPCS devices.

14. The method of claim 13, wherein:

the AP supports prioritization for the EPCS devices, and the method further comprises identifying the priority level for the STA.

15. The method of claim 14, wherein the priority level for the STA is based on a device identification.

16. The method of claim 14, further comprising:

transmitting, to the AP, a request for a priority level change; and receiving, from the AP, a response to the request for a priority level change.

17. The method of claim 14, further comprising:

transmitting, to the AP, information associated with a mode that the STA is running or intends to run; and receiving an indication associated with the priority level for the STA from the AP based on the information associated with the mode that the STA is running or intends to run.

18. The method of claim 14, further comprising:

transmitting, to the AP, information associated with link prioritization for the STA; and receiving an indication associated with the priority level for the STA from the AP based on the information associated with the link prioritization for the STA.

19. The method of claim 14, wherein the priority level for the STA is based on a service type.

20. The method of claim 19, further comprising:

transmitting, to the AP, information associated with the service type that the STA is running or intends to run; and receiving an indication associated with the priority level for the STA from the AP based on the information associated with the service type that the STA is running or intends to run.

* * * * *